US012682261B1

(12) United States Patent
    Lin et al.

(10) Patent No.: US 12,682,261 B1
(45) Date of Patent: Jul. 14, 2026

(54) DYNAMIC GENERATION OF ALTERNATIVE QUESTIONS

(71) Applicant: QUIZLET, INC., San Francisco, CA (US)

(72) Inventors: Tingting Lin, San Francisco, CA (US); Anna Khazenzon, Berkeley, CA (US); Shane Mooney, Austin, TX (US)

(73) Assignee: Quizlet, Inc., San Francisco, CA (US)

( * ) Notice: Subject to any disclaimer, the term of this patent is extended or adjusted under 35 U.S.C. 154(b) by 831 days.

(21) Appl. No.: 17/970,120

(22) Filed: Oct. 20, 2022

Related U.S. Application Data

(60) Provisional application No. 63/338,552, filed on May 5, 2022.

(51) Int. Cl.
    *G06N 5/04* (2023.01)

(52) U.S. Cl.
    CPC ..................................... *G06N 5/04* (2013.01)

(58) Field of Classification Search
    CPC ....................................................... G06N 5/04
    See application file for complete search history.

(56) References Cited

U.S. PATENT DOCUMENTS

| | | | | |
|---|---|---|---|---|
| 2017/0132329 | A1* | 5/2017 | Yakout | ................. G06F 16/9024 |
| 2020/0311800 | A1* | 10/2020 | Srinivasan | .......... G06F 16/3344 |
| 2021/0097978 | A1* | 4/2021 | Mei | ........................ G10L 15/183 |
| 2021/0241865 | A1* | 8/2021 | Bhattacharya | .......... G06F 30/20 |
| 2023/0041580 | A1* | 2/2023 | Zaret | ....................... G16H 20/40 |
| 2023/0142718 | A1* | 5/2023 | Asgekar | ............ G06F 16/90335 |
| | | | | 705/326 |

OTHER PUBLICATIONS

S. Gupta, "Locality Sensitive Hashing," published Jun. 29, 2018, downloaded Jan. 16, 2023 from "https://towardsdatascience.com/understanding-locality-sensitive-hashing-49f6d1f6134," 20 pages.
"Duhaime," "Minhash class," undated, downloaded Jan. 16, 2023 from "https://github.com/duhaime/minhash/blob/master/src/minhash.js," 3 pages.

(Continued)

*Primary Examiner* — Cesar B Paula
*Assistant Examiner* — David Tan
(74) *Attorney, Agent, or Firm* — Baker Botts L.L.P.

(57) ABSTRACT

In one embodiment, a method includes storing machine learning classification models, retrieving metadata including a plurality of terms, each of the terms include a question side value and an answer side value, categorizing each of the terms into a particular type and identifying the answer side value of each of the plurality of terms, executing instructions to cluster the question side values and answer side values according to one or more criteria, receiving text input including a first term, retrieving the one or more clusters of question side values and answer side values corresponding to the text input of the first term, filtering and ranking the clusters of question side values and answer side values based on one or more attributes corresponding to the first term, determining a first cluster of question side values and answer side values are ranked above a predetermined threshold, displaying the alternative questions.

13 Claims, 10 Drawing Sheets

900 —

902 Digitally storing, in memory of a server computer, a plurality of machine learning classification models 904 Retrieving, from the server computer, metadata including a plurality of terms, wherein each of the terms include a question side value and an answer side value 906 Categorizing, by one or more machine learning models, each of the plurality of terms into a particular type and identifying the answer side values of each of the plurality of terms 908 Executing, by the one or more machine learning models, one or more algorithms with instructions to cluster the question side values and answer side values of each of the one or more terms according to one or more criteria 910 Receiving, by a client computing device, text input including a first term 912 Retrieving, from the server computer, the one or more clusters of question side values and answer side values corresponding to the text input of the first term 914 Filtering and ranking the one or more clusters of question side values and answer side values based on one or more attributes corresponding to the first term 916 Determining a first cluster of question side values and answer side values are ranked above a predetermined threshold, the first cluster being categorized as one or more alternative questions 918 Displaying, via a graphical user interface at the client computing device, the one or more alternative questions

(56) References Cited

OTHER PUBLICATIONS

Anonymous, "nnlm-en-dim50: Token based text embedding trained on English Google News 7B corpus," pub. by Google TensorFlow Hub, undated, downloaded Jan. 16, 2023 from "https://tfhub.dev/google/nnlm-en-dim50/2," 1 page.

Anonymous, "The Create Model statement," undated, downloaded Jan. 16, 2023 from "https://cloud.google.com/bigquery-ml/docs/reference/standard-sql/bigqueryml-syntax-create-tensorflow," 6 pages.

* cited by examiner

200

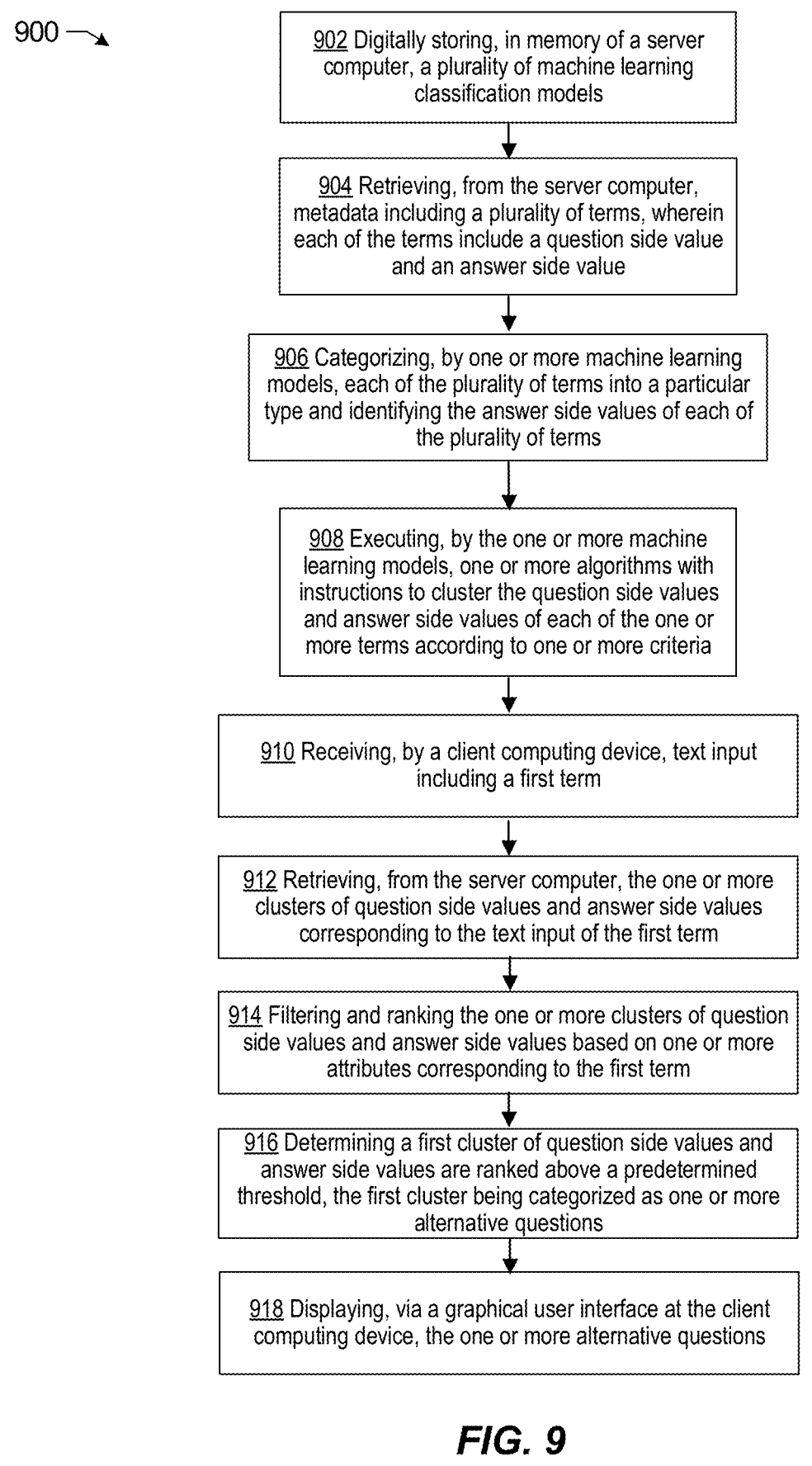

900 ⟶

902 Digitally storing, in memory of a server computer, a plurality of machine learning classification models

↓

904 Retrieving, from the server computer, metadata including a plurality of terms, wherein each of the terms include a question side value and an answer side value

↓

906 Categorizing, by one or more machine learning models, each of the plurality of terms into a particular type and identifying the answer side values of each of the plurality of terms

↓

908 Executing, by the one or more machine learning models, one or more algorithms with instructions to cluster the question side values and answer side values of each of the one or more terms according to one or more criteria

↓

910 Receiving, by a client computing device, text input including a first term

↓

912 Retrieving, from the server computer, the one or more clusters of question side values and answer side values corresponding to the text input of the first term

↓

914 Filtering and ranking the one or more clusters of question side values and answer side values based on one or more attributes corresponding to the first term

↓

916 Determining a first cluster of question side values and answer side values are ranked above a predetermined threshold, the first cluster being categorized as one or more alternative questions

↓

918 Displaying, via a graphical user interface at the client computing device, the one or more alternative questions

*FIG. 9*

DYNAMIC GENERATION OF ALTERNATIVE QUESTIONS

BENEFIT CLAIM

This application claims the benefit under 35 U.S.C. 119 of provisional application 63/338,552, filed May 5, 2022, the entire contents of which are hereby incorporated by reference for all purposes as if fully set forth herein.

COPYRIGHT NOTICE

TECHNICAL FIELD

One technical field of the disclosure is computer-implemented machine learning, in the subfield of natural language processing, using models that are programmed to generate alternative questions. Another technical field is machine learning model development, training, deployment, and evaluation. Another technical field is distributed systems, such as computer-implemented SaaS systems for processing sets of questions over a network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern online learning systems have made targeted instruction—in a wide variety of subjects—more accessible than ever before. Outside of traditional educational institutions, diverse groups of students spread across the globe can learn just about anything without ever setting foot in a classroom. But online learning systems face unique challenges in certain aspects of their operations, including challenges for students with deeper learning goals. Currently, students seeking deeper understanding and flexible knowledge of material are limited by the prepared materials accessible to them (for example, reading notes, study guides, practice tests). However, by exposing learners to content (for example, questions) they haven't seen before, the learners may test themselves and gain flexible knowledge.

Some online learning systems interoperate with a vast network of content consisting of billions of phrases that have been previously created and stored by user interaction with elements of the system; examples include phrases in questions that users have created and stored in question sets. In response to receiving input containing a particular phrase and its definition, the system may use fuzzy matching to link the phrase to similar answer groups and filter the questions from the answer groups for this specific phrase. Challenges exist in retrieving, grouping, and filtering the vast amount of previously generated content. Further challenges may exist in developing a personalized experience for each learner based on particular criteria (for example, grade level, current knowledge state of a particular topic) so the learner may access relevant practice questions related to the concept the learner is studying, but different enough to challenge the user. If a technical solution could be developed to effectively address the aforementioned issues, then it would represent a significant advance in the state of the art.

BRIEF DESCRIPTION OF THE DRAWINGS

In the drawings:

FIG. 9 illustrates a flow diagram of a method for dynamic generation of alternative questions.

DETAILED DESCRIPTION

Figure 1:
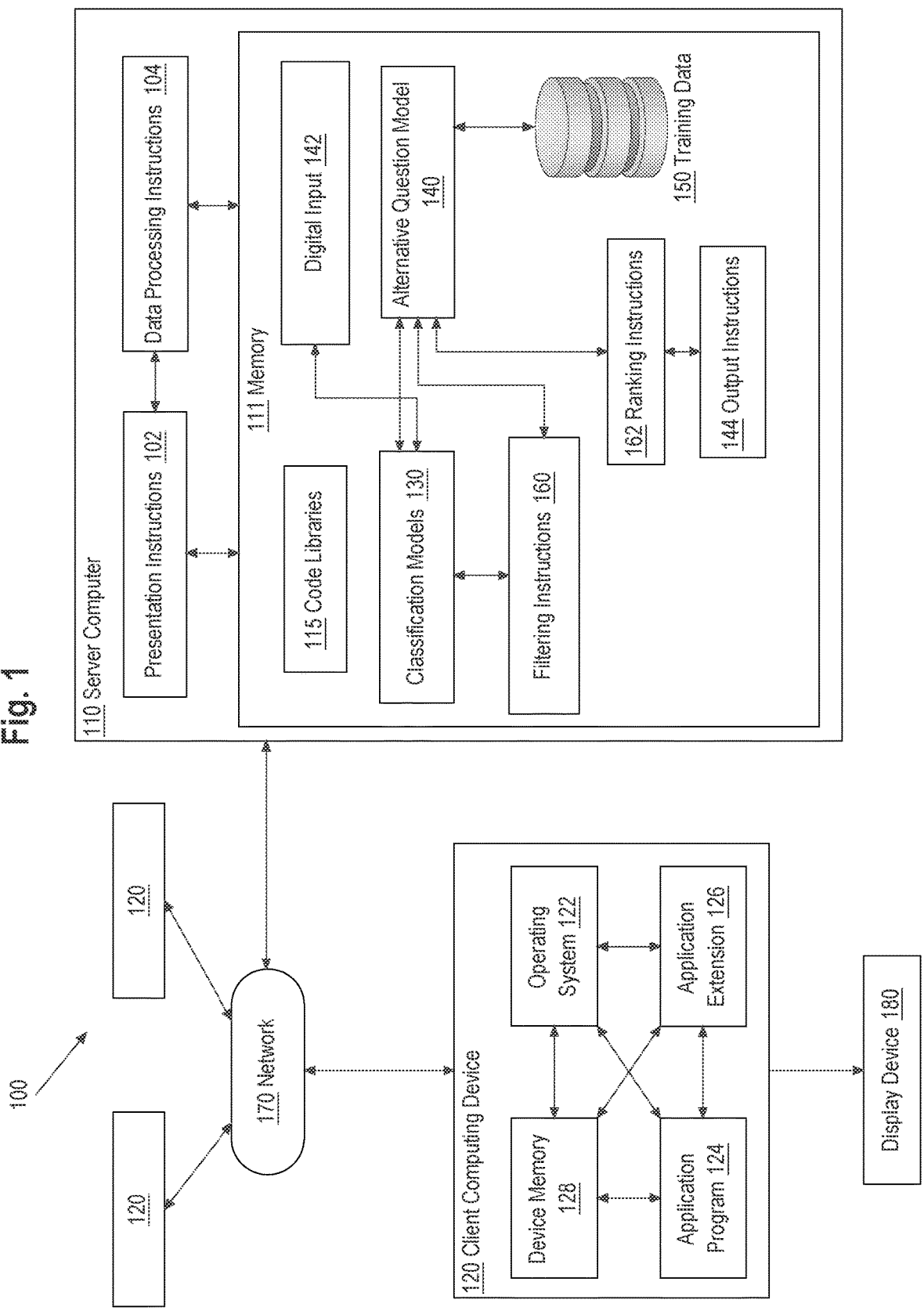
FIG. 1 depicts an example system for dynamic generation of alternative questions.

In the following description, for the purposes of explanation, numerous specific details are set forth in order to provide a thorough understanding of the disclosure. It will be apparent, however, that embodiments may be practiced without these specific details. In other instances, well-known structures and devices are shown in block diagram form in order to avoid unnecessarily obscuring the disclosure. Embodiments are disclosed in sections according to the following outline:

1.0 General Overview
2.0 Structural & Functional Overview
    2.1 The Dynamic Generation of Alternative Questions Task
    2.2 Training Machine Learning Models with Term Format Classification
    2.3 Example Dynamic Generation of Alternative Questions Process
3.0 Implementation Example—Hardware Overview

1.0 General Overview

In one embodiment, the disclosure provides a programmed computer system or platform implemented via client-server Software as a Service (SaaS) techniques that causes the retrieval and/or generation of alternative questions. Technical advantages of embodiments of the disclosed technology include dynamically generating alternative questions tailored towards a learner's study goals and current knowledge state. Embodiments may retrieve a vast amount of user generated content and determine and/or generate relevant alternative practice questions within the same concept that a learner is studying, but different enough to challenge the user.

In one embodiment, the disclosure provides a distributed computer system and computer-implemented methods that can be collectively termed a Dynamic Generation of Alternative Questions (DGAQ) system. The label DGAQ is used merely as convenient shorthand for the systems, methods, and computer program products that are described as one embodiment of the disclosure, but the label DGAQ is not required in all embodiments and functionally equivalent systems, methods and products are within the scope of the disclosure. Embodiments may avoid slow and computationally expensive steps of manually labeling and/or categorizing a large dataset of reference terms to determine alternative questions within particular concepts at particular difficulty levels. Embodiments may utilize machine learning classification models to dynamically generate alternative questions in real-time in response to queries or search requests, the alternative questions covering a wide area of concepts and difficulty levels, quickly identifying high-quality and high-relevance content for display to the learner.

Among other things, the disclosure provides computer-implemented systems and methods for digitally storing, in memory of a server computer, a plurality of machine learning classification models. In an embodiment, the server computer may retrieve metadata including a plurality of terms, wherein each of the terms include a question side value and an answer side value. After retrieving the metadata, one or more machine learning models may categorize each of the plurality of terms into a particular question type and identify the answer side value of each of the plurality of terms. In an embodiment, the one or more machine-learning models may execute one or more algorithms with instructions to cluster the answer side values and then map question side values to the answer clusters of the one or more terms or question side clusters according to one or more criteria. In an embodiment, a client computing device may receive text input including a first term. In embodiments, the method may retrieve, from the server computer, the one or more clusters of question side values and answer side values corresponding to the text input of the first term. In embodiments, the method may filter and rank the one or more clusters of question side values and answer side values based on one or more attributes corresponding to the first term. After determining a first cluster of question side values are ranked above a predetermined threshold, the first cluster may be categorized as one or more alternative questions. In embodiments, the method may display, via a graphical user interface at the client computing device, the one or more alternative questions.

One embodiment may include that each of the terms may further comprise at least a word and a definition. Another embodiment may include transmitting, from the server computer to the client computing device, first display instructions that are formatted to cause displaying, in the graphical user interface, an editable text field and prompt to input a term, receiving text input via the editable text field, and determining the text input includes at least one term.

One embodiment may include that filtering and ranking of the one or more clusters of question side values and answer side values further comprise categorizing the one or more attributes, wherein the attributes include one or more of a grade level, subject type, or popularity score.

One embodiment may include that in response to filtering and ranking the one or more clusters of question side values and answer side values based on the one or more categories corresponding to the first term, tokenizing the plurality of terms into one or more n-grams, and determining a semantic similarity between the text input including the first term and the tokenized plurality of terms. In one specific implementation, the range of n could be three to four, but other implementations can use different values.

One embodiment may include applying a locality-sensitive hashing (LSH) algorithm to the n-grams, transforming the n-grams into a string.

In embodiments, the filtering may further comprise transmitting, from the server computer to the client computing device, second display instructions that are formatted to cause displaying, in the graphical user interface, a request for context. In embodiments, the method may receive context input from the graphical user interface of the client computing device, and in response to receiving the context input, the method may determine a knowledge state of the user of the client computing device. In embodiments, the method may filter the alternative questions based on the determined knowledge state.

One embodiment may include determining, by one or more machine learning models, a normalization coefficient for the answer value side of each of the plurality of terms and filtering the answer value side of each of the plurality of terms by the normalization coefficient.

2.0 Structural & Functional Overview

FIG. 1 depicts an example distributed computer system 100 with an architecture and programming for dynamic generation of alternative questions. Computer system 100 can be termed a DGAQ system in some embodiments. FIG. 1, and the other drawing figures and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of machine grading of short answers with explanations. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, a distributed computer system comprises a server computer 110 that is communicatively coupled to client computing device 120 over network 170. Network 170 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have wired or wireless communications links. The server computer 110, the client computing device 120, and other elements of the system may each comprise an interface compatible with the network 170 and may be programmed or configured to use standardized protocols for communication across the networks such as IP, TCP, HTTP, and application-layer protocols.

In one embodiment, client computing device 120 may be a computer that includes hardware capable of communicatively coupling the device to one or more server computers, such as server computer 110, over one or more service provides. For example, the client computing device 120 may include a network card that communicates with server computer 110 through a home or office wireless router (not illustrated in FIG. 1) that is communicatively coupled to an internet service provider. The client computing device 120 may be a smartphone, personal computer, tablet computing device, PDA, laptop, or any other computing device capable of transmitting and receiving information and performing the functions described herein.

In one embodiment, the client computing device 120 may comprise device memory 128, operating system 122, application program 124, and application extension 126.

The server computer 110 may be implemented using a server-class computer or other computer having one or more processor cores, co-processors, or other computers. The server computer 110 may be a physical server computer and/or virtual server instance stored in a data center, such as through cloud computing. In one embodiment, server computer 110 may be implemented using two or more processor cores, clusters, or instances of physical machines or virtual machines, configured in a discrete location, or co-located with other elements in a datacenter, shared computing facility, or cloud computing facility. For example, server computer 110 may comprise a first computing device programmed to train a machine learning model by executing programmed instructions for dynamic generation of alternative questions and one or more additional computing devices programmed to store and/or retrieve training data 150 in a Client-Server distributed system.

In an embodiment, server computer 110 comprises one or more sequences of data processing instructions 104 coupled to both presentation instructions 102 and memory 111. The memory 111 may represent any transitory or non-transitory computer-readable electronic digital memory accessible by the server computer 110 including a relational database, a data lake, cloud data storage, local hard drives, computer main memory, or any other form of electronic memory. In various embodiments, server computer 110 may store and execute sequences of programmed instructions of various types to cause execution of various methods. For example, server computer 110 may execute the data processing instructions 104 and the presentation instructions 102 in various programmed methods, but server computer 110 may also execute other types of programmed instructions in particular embodiments. The data processing instructions 104 may be executed by the server computer 110 to process or transform data, such as by executing a programmed machine learning model, or to cause data stored in memory 111 to be transmitted to client computing device 120 over the network 170. In an embodiment, presentation instructions 102 implement a presentation layer and may be executed by server computer 110 to cause presentation in a display of a computing device communicating with server computer 110 over network 170 (such as client computing device 120) or to cause the transmission of display instructions to such a computing device, the display instructions formatted to cause such presentation upon execution.

Rather than comprising a general-purpose computer, the server computer 110 may be specially configured or programmed with the functional elements shown in FIG. 1, which includes functional elements relevant both to training machine learning models and using the models in an inference stage to generate predictions. In an embodiment, memory 111 comprises code libraries 115, digital input 142, classification models 130, alternative question model 140, filtering instructions 160, ranking instructions 162, and output instructions 144. Classification models 130 can be programmed to execute, at an inference stage after training, the classification of digital input 142 to implement a Dynamic Generation of Alternative Questions (DGAQ) task. Each classification model of the one or more classification models 130 may comprise a random forest classification model configured to receive, via digital input 142, an array representing the frequency count of a specific vocabulary In an embodiment, an alternative question model 140 may be stored in memory 111 of server computer 110. The alternative question model 140 may be programmed to generate questions through fuzzy matching with other user-generated questions, and can be implemented using a multi-layer bidirectional Transformer-based encoder. Each of the classification models 130 and alternative question model 140 may have various machine learning parameters and configuration data stored in memory 111. Further, server computer 110 may also store and/or utilize a variety of other suitable machine learning models not depicted in FIG. 1.

In an embodiment, training datasets, validation datasets, input datasets, and result datasets may be stored in memory 111 and programmatically accessed by server computer 110 in conjunction with the classification models 130 and alternative question model 140. For example, a corpus of unlabeled training data 150 may be stored in memory 111 or accessible via an independent database. The corpus of unlabeled training data 150 may be used to train the classification models 130 and/or the alternative question model 140, under full programmatic control, by server computer 110 executing data processing instructions 104. The server computer 110 also may execute data processing instructions 104 to train the alternative question model 140 using the training data 150.

Server computer 110 can be programmed to execute data processing instructions 104 programmed to cause fine-tuning of the plurality of classification models 130. The fine-tuning may comprise updating model parameters of the plurality of classification models 130 in memory 111 by executing interference techniques.

After training, at an inference stage, the plurality of classification models 130 can interoperate with the alternative question model 140 to support generation of alternative questions. As further described in other sections, filtering instructions 160 can be programmed to filter output classifications from the classification models 130 to inform the alternative question model 140. The ranking instructions 162 can be programmed to rank classification output of the classification models 130 and alternative question model 140 for the DGAQ task to determine what output to present to the user via output instructions 144. Thus, filtering instructions 160 and ranking instructions 162 execute post-processing handling of the output from the models and the processes that are further described herein in other sections.

In one embodiment, digital input 142 may be stored in memory 111 of server computer 110. Digital input 142 may comprise a plurality of terms. As used herein, "terms" may refer to one or more flashcards. Each term may contain two sides: a word side and a definition side. As terms are user generated data, users are free to put content on either side, so the word and definition sides of the plurality of terms may not be consistent. To standardize the content, the DGAQ system may reform terms into questions and answers, wherein a created pool of question and answer pairs may be used as alternative questions. As an example, the digital input 142 may have been received by server computer 110 from client computing device 120. In one embodiment, server computer 110 may execute data processing instructions 104 formatted to cause processing of the digital input 142, using a trained classification model 130, to cause generating and storing digital data.

In one embodiment, in order to execute the various techniques described in this disclosure, server computer 110 may execute functions defined or specified in one or more code libraries 115, information of which may be stored in memory 111 or dynamically accessible by server computer 110. In one embodiment, the code libraries 115 may comprise one or more PYTHON libraries. In one embodiment, the code libraries 115 may comprise TENSORFLOW, PYTORCH, any of several Transformer open source libraries, KERAS, or ONNX. The code libraries 115 may also comprise other code libraries 115 available or usable in data science and/or machine learning such as NUMPY and/or PANDAS, or others.

2.1 the Dynamic Generation of Alternative Questions Task

The Dynamic Generation of Alternative Questions (DGAQ) task may be characterized as a computerized task of identifying key terms and generating alternative questions for presentation to a user (for example, learner). Programmed machine learning models of embodiments may be trained, at server computer 110, to group, retrieve, and filter questions and answers according to one or more criteria. In an embodiment, digital input 142 and/or training data 150 may store content as terms in memory 111 of server computer 110. As an example, a term may be generated by a user of client computing device 120, wherein the term may be transmitted via network 170 to memory 111 of server computer 110. It is understood that a user of client computing device 120 may generate content on either the word side and/or the definition side of the term (for example, flash-card). To standardize the content of each term, one or more machine learning models of server computer 110 may, through one or more classification models 130, separate each term into questions and answers. In one embodiment, the questions and answers of terms classified by one or more classification models 130 may be stored in memory 111 of server computer 110. In an embodiment, filtering instructions 160 may be executed to filter the question side value and answer side values according to ranking instructions 162. Ultimately, when alternative questions satisfying a particular ranking threshold are identified, output instructions 144 may input the identified alternative questions into the alternative question model 140. In some embodiment, the alternative questions may be displayed to the learner at client computing device 120. The presentation instructions 102 can be programmed to receive the alternative questions and generate dynamic HTML or other forms of presentation for the client computing device 120.

In an embodiment, the one or more classification models 130 may be machine-learning models with instructions to categorize terms into different term types. As an example, the term types may include Multi-choice Question (MCQ), Fill-in-the-Blank (FITB), Pure Question, and Raw. Although this disclosure describes the aforementioned term types, this disclosure contemplates any suitable term type.

In an embodiment, the one or more classification models 130 may normalize the answer side of each term to exclude generic, common, and/or noisy answers from the answer pool. The resulting answer sides may be stored in memory 111 of server computer 110. Table 1, below, displays examples of normalized questions, answers, and corresponding question types.

TABLE 1

| term_type | question | answer | normalized_question | normalized_answer |
|---|---|---|---|---|
| 0 raw | Moderate regenerative ability A) cardiac muscle B) tendons and ligaments C)smooth muscle D)skeletal muscle E)areolar connective tissue | smooth muscle | Moderate regenerative ability acardiac muscle btendons ligaments csmooth muscle dskeletal muscle eareolar connective tissue | smooth muscle |
| 1 pure_question | The management and analysis of large data sets | bioinformatics is . . . | Management analysis if large data sets | bioinformatics |
| 2 pure_question | Wandering macrophages recognize microorganisms by means of: | both TLRs and NOD proteins | Wandering macrophages recognize microorganisms by means | both tlrs nod proteins |
| 3 pure_question | Organ chamber or cavity that receives or holds fluid | ventricle | Organ chamber or cavity that receives or holds fluid | ventricle |
| 4 raw | Type of resistance increase in aortic valve stenosis | increased left ventricular after load | Type resistance increased aortic valve stenosis | increased left ventricular after load |

TABLE 1-continued

| term_type | question | answer | normalized_question | normalized_answer |
|---|---|---|---|---|
| 5 pure_question | Shoulder blade, bone that connects the humerus to the collar bone | scapula bone | Shoulder blade bone that connects humerus collar bone | scapula bone |
| 6 pure_question | Diffusion of water through a selectively permeable membrane | osmosis | Diffusion water through selectively permeable membrane | osmosis |
| 7 pure_question | Nuclear envelope breaks down and a second melotic division begins | Prophase II | Nuclear envelope breaks down second meiotic division begins | prophase ii |
| 8 pure_question | What happens if a pathogen enters the body, but not via its usual portal of entry? | It probably won't infect the host | what happens if pathogen enters body but not via its usual portal entry | it probably won't infect host |
| 9 pure_question | Special contractile cells, located among the glomerular capillaries, that help regulate glomerular filtration. | mesangial cells | Special contractile cells located among glomerular capillaries that help regulate glomerular filtration | Mesangial cells |
| 10 pure_question | Bones consist of an outer covering of compact (dense) bone surrounding a core of cancellous (spongy) bone | cancellous bone | bones consist of an outer covering compact dense bone surrounding core cancellous spongy bone | Cancellous bone |
| 11 pure_question | The spread of cancer from the primary tumor to distant sites via the lymph or blood; often, lymph nodes may be removed or treated to eradicate any micrometastases of early-stage metastasizing cancers (such as breast cancer) | -metastasis | spread cancer from primary tumor distant sites via lymph or blood often lymph nodes may be removed or treated eradicate any micrometastases early stage metastasizing cancers such as breast cancer | metastasis |
| 12 mcq | 9. What makes the Nuclear Engineering unique among the other departments? a. Large amount of students b. On campus research c. Nuclear reactor on-site d. Their own library | c. Nuclear reactor on-site | 9 what makes nuclear engineering unique among other departments large amount students b campus research c nuclear reactor site d their own library | Nuclear reactor site |
| 13 pure_question | Carry information out of the nucleus from DNA to the site of protein synthesis. One of the many | Messenger RNA (mRNA) | carry information out nucleus from dna site protein synthesis one many distinct types rna | Messenger rna mrna |

TABLE 1-continued

| term_type | question | answer | normalized_question | normalized_answer |
|-----------|----------|--------|---------------------|-------------------|
| | distinct types of RNA. | | | |
| 14 fitb | Another name for a chromosome is a _____, since it contains genes that are often inherited together. | Linkage Group | another name for chromosome is since it contains genes that are often inherited together | linkage group |

As demonstrated above in Table 1, the DGAQ system may receive digital input 142 from a learner in the form of one or more terms. The terms may be passed as input to one or more classification models 130, which may classify each of the terms into a term type (for example, term_type). For example, in Table 1, term 0 has been classified as "raw," wherein terms 1-3 have been classified as "pure_question." In this example, one or more classification models 130 may generate a term type with information specifying which side is a question or answer. A normalization process also can be used to generate a normalized question (for example, normalized_question) and normalized answer (for example, normalized_answer) corresponding to each input question and answer.

In one embodiment, memory 111 can include instructions to implement a locality-sensitive hashing (LSH) algorithm to cluster the normalized answers to create answer clusters, after which a post-process can be programmed to map questions to answer clusters so that similar answers can get as many candidate questions as possible.

Classification models 130 may classify the term format such that the classification models 130 may identify the answer side of the term (for example, answer side value). As an example, once the classification models 130 identify the answer side of the term, the classification models 130 may extract raw answer text. The raw answer text may pass through multiple layers of filtering and processing. One layer of processing may apply a base filter on raw answers that contain particular attributes. For example, the classification models 130 may apply a base filter only on raw answers that contain alphanumeric characters, at least four (4) characters, and do not contain special characters (for example, http://).

For answers that satisfy the aforementioned requirements, the answer may then be normalized through a series of steps. As an example, the first normalization step may be to convert all characters to lowercase characters. Next, a Normalization Form Compatibility Decomposition (NFKC) normalization may be applied to standardize strings with different Unicode code points. Further, all non-number and non-alphabet characters may be removed, and all extra whitespaces may be trimmed and removed (for example, keep one space between words only). As another example, the normalization process may continue by removing stop words such as a, an, at, and, in, etc. Next, the normalization process may remove list item labels. For example, if the answer is identified for an MCQ question, the raw answer may be "(C) Mitosis", and after processing all prior normalization steps, the raw answer may become "c mitosis," wherein a further step may be taken to remove the option label and keep only "mitosis."

In an embodiment, after completing the normalization process, a conceptual filter may be applied to normalized answers to ensure that the answer contains contextual information. As an example a conceptual filter on normalized answers may ensure that the average number of characters per word in the answer is ≥4 characters, exclude answers with numbers, exclude answers that contain stop words (for example, increase, decrease, all above, true, false, none of these), and/or exclude answers that are in sets under multiple different subject categories but lack a dominant subject categorization. In an embodiment, the filtered normalized answers may then be transformed to a long string that is the concatenation of n-grams in a range from 3 to 4, wherein the LSH algorithm may then be applied to the transformed strings.

With more than hundreds of millions of previously stored terms in training data 150, it may be both resource and cost prohibitive to compare all possible combinations of questions and answers using a brute-force approach. To find near duplicates efficiently, the DGAQ system may utilize a locality-sensitive hashing algorithm (LSH) used in an approximate nearest neighbor (ANN) search. However, as LSH works best for long texts, and terms are generally short texts (fewer than 10 words), in some embodiments, memory 111 may store instructions that are programmed to tokenize the short text of each term into n-grams with an n-range from 3 to 4. As an example, the DGAQ system may convert each term into a set of characters of length n, to represent each term as a set of n-grams. In an embodiment, the LSH algorithm may group MinHash signatures of the normalized answers into buckets/groups, wherein answers within the same bucket may have a particular level of Jaccard similarity. The Jaccard index between term A and term B may be defined as:

$$J(A, B) = \frac{|A \cap B|}{|A \cup B|} \qquad \text{(Equation 1)}$$

Equation 1 may also be known as intersection over union, wherein J is the Jaccard distance, A represents Term A, and B represents Term B. The resulting Jaccard distance may be measured on a range of 0% to 100%, wherein the higher the percentage, the more similar the terms (for example, Term A and Term B). As an example, the LSH algorithm may be applied on the concatenated n-grams with an end result of clustering answers within minutes and with high accuracy.

In an embodiment, the memory 111 may store instructions that are programmed to generate an answer cluster table and a question cluster table, wherein the two tables may be linked by a hashed cluster key. Table 2, below, demonstrates examples of clustered answers.

TABLE 2

| cluster_key | normalized_answer | cluster answer |
|---|---|---|
| 4wHxLxqaPainOZSByb6QXg== | arterial problem | arterial problem |
| 4wHxLxqaPainOZSByb6QXg== | arterial problems | arterial problem |
| 4wHxLxqaPainOZSByb6QXg== | s arterial problem | arterial problem |

As demonstrated by Table 2, the cluster answers are all the same (for example, arterial problem), wherein the normalized answer (for example, normalized_answer) may contain variation from the cluster answer. Table 3, below, demonstrates examples of questions mapped to the answer cluster.

TABLE 3

| Category | Example 1 | Example 2 | Example 3 |
|---|---|---|---|
| grade_level | College | grad_school | college |
| subject_level_1 | Science | Science | Science |
| subject_level_2 | Biology | Biology | Biology |
| subject_level_3 | Anatomy | Anatomy | Anatomy |
| cluster_key | 4wHxLxqaPainOZSByb6QXg== | 4wHxLxqaPainOZSByb6QXg== | 4wHxLxqaPainOZSByb6QXg== |
| cluster_answer | arterial problem | arterial problem | arterial problem |
| questions | Do individuals experience greater pain with arterial or venous problems? | What is indicated if a limb is cool? | cool extremity pulseless slow cap refill |
| answers | Arterial problems | arterial problem | S/s of arterial problem |
| term_id | 15387279435 | 20522480500 | 4100289670 |

As demonstrated by Table 3, in an embodiment, filtering instructions 160 may be programmed to filter questions for specific terms with high-relevance. To generate alternative questions for a specific question and answer pair, the memory 111 may be programmed to normalize an answer to search one or more answer lookup tables (for example, training data 150) to retrieve the answer cluster key that contains the normalized answer based on one or more criteria. For example, one criterion may be a grade level (indicated as grade_level in Table 3), such as elementary school, college, or graduate school. As another example, another criterion may be a subject. In an embodiment, the subject may have a plurality of levels. For example, in Table 3, the level one subject (for example, subject_level_1) of Examples 1-3 was indicated as "Science". In an embodiment, the level one subject may be further categorized by one or more sub-subjects or subcategories. For example, in the case of Table 3, subject_level_2 was categorized and labelled as "Biology" for Examples 1-3. As an example, as demonstrated in Table 3, a subcategory of subject_level_2 and subject_level_3 were categorized and labelled as "Anatomy" for Examples 1-3.

In some embodiments, ranking instructions 162 may rank the filtered questions by relevance, whereas output instructions 144 may output tailored questions to a user. In this way, the answer cluster key (for example, cluster_key 4wHxLxqaPainOZSByb6QXg== in Examples 1-3 of Table 3) can be used to retrieve a question list from the question lookup table. However, a popular answer cluster may have dozens up to thousands of questions. In this case, the ideal question should differ from the original question but still be within the same topic, as measured by semantic similarity. As Table 3 demonstrates, the cluster keys (for example, cluster_key) of Examples 1-3 are mapped to a cluster answer (for example, cluster_answer) of "arterial problem." In an embodiment, the "Questions" and "Answers" of Examples 1-3 in Table 3 may be linked by a hashed cluster key (for example, cluster_key). In an embodiment, each unique answer may be assigned a term identifier (for example, term_id).

In an embodiment, filtering instructions 160 may be programmed to filter questions based on one or more criteria. For example, filtering instructions 160 may narrow down candidate questions based on grade level and level two subject. Then, using semantic similarities based on sentence embeddings and a length ratio between the original question and alternative question candidates, the filtering instructions 160 may be programmed to categorize candidate questions by grouping the candidate questions to "rewording" and "context." In an embodiment, after filtering instructions 160 have been executed, ranking instructions 162 may execute ranking of the candidate questions based on one or more criterion. As an example, the ranking instructions 162 may rank the candidate questions by popularity. In this example, popularity may be measured by how many users have studied the question over a particular period of time. As another example, ranking instructions 162 may rank the candidate questions by format quality. In this example, the format quality may measure if the candidate questions are in a clear and user-friendly questioning format. In one embodiment, multiple ranking attributes may be combined by ranking instructions 162, wherein the top candidate questions may be determined and further split into one or more categories, such as a "rewording" category and/or a "context" category. In an embodiment, depending on the user's knowledge state for the set they are currently studying, particular candidate questions may be displayed to the user via a graphical user interface of the client computing device 120.

2.2 Training Machine Learning Models with Term Format Classification

Figure 2:
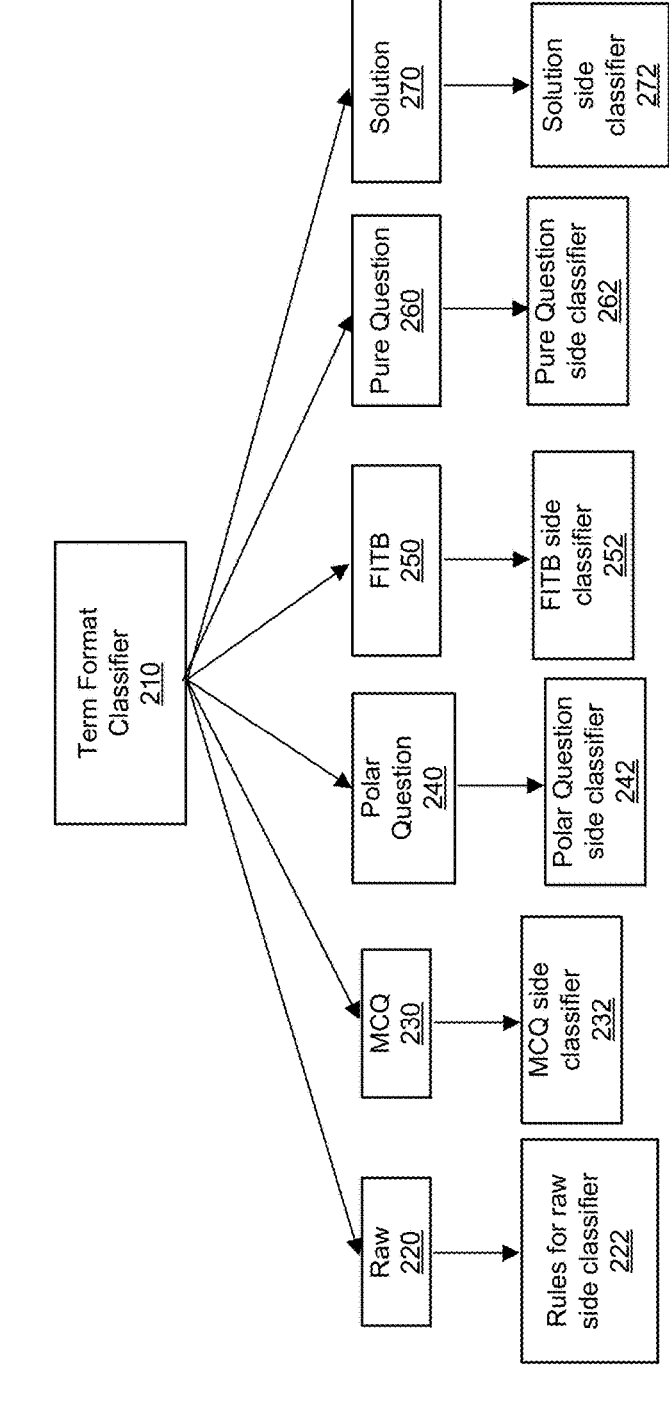
FIG. 2 illustrates an example flowchart of a Term Format Classification process.

FIG. 2 illustrates an example flowchart 200 of a Term Format Classification Process. In one embodiment, the Term Format Classification process may use APACHE KAFKA to stream classification in near real-time after a term is created. As an example, after a term is created, and passed through one or more classification models 130, the classified output data may be passed to a Spanner and/or BigQuery (BQ) database. Although Spanner and BigQuery databases are specifically recited, this disclosure contemplates any suitable database and the specific infrastructure specified in this paragraph is only one example implementation.

In an embodiment, the Term Format Classification process may utilize a hierarchical model to classify a term and corresponding sides. For example, each term may include corresponding side models. In an embodiment, a term may be passed to the term format classifier 210, wherein the term format classifier 210 may determine a term type for the particular term. As an example, the term model may utilize a Random Forest classifier, which may contain a number of decision trees on various subsets of the given dataset. For example, the term format classifier 210 may categorize the term as a raw term 220, multi-choice question (MCQ) 230, polar question 240, fill-in-the-blank (FITB) question 250, pure questions 260, or a solution 270. In an embodiment, each of the raw term 220, MCQ 230, polar question 240, FITB 250, pure question 260, and solution 270 are classified as side models, wherein each side model also utilizes a Random Forest classifier.

In an embodiment, the term format classifier 210 may classify a term as "raw term" 220, in which case the term may be passed to a raw side classifier 222 containing rules for the raw side classifier. As an example, when the term format classifier 210 determines a term is a MCQ 230, the term format classifier 210 may pass the term to a MCQ side classifier 232. As another example, the term format classifier 210 may determine a term is a polar question 240 type, in which case the term format classifier 210 may pass the term to a polar question side classifier 242. As another example, the term format classifier 210 may determine a term is a FITB question 250, wherein the term format classifier 210 may pass the term to FITB side classifier 252. As an example, term format classifier 210 may classify a term as a pure question 260, in which case the term format classifier 210 may pass the term to pure question side classifier 262. As another example, term format classifier 210 may determine a term is a solution 270, in which case the term format classifier 210 may pass the term to solution side classifier 272. It is understood that the feature inputs used for all the models may be the same.

In an embodiment, the DGAQ system may retrieve term formats in BQ directly for use in data preparation.

Table 4.1, below, displays example input data:

TABLE 4.1

EXAMPLE INPUT DATA

"set_id". "ID of the set"
"term_id" "ID of the term"
"side1" "The word side"
"side2": "The definition side".
"lang_side1" "Language of the word side"
"lang_side2" "Language of the def side"

As demonstrated in Table 4.1, digital input 142 of a term may include an identification (ID) of both the set and of the term. The term may include a word side (for example, side 1) and a definition side (for example, side 2), as well as language of the word side (for example, lang_side1) and language of the definition side (for example, lang_side2).

Table 4.2, below, displays example output data in Big-Query

TABLE 4.2

EXAMPLE OUTPUT DATA

"set_id" "ID of the set".
"term_id" "ID of the term".
"term format": "term type: MCQ, FITB, Pure Questions, etc."
"card side": "word side or definition side of the term"

TABLE 4.2-continued

EXAMPLE OUTPUT DATA

"side_format": "type of the card side: question, answer, longer, shorter, etc"

As demonstrated above in Table 4.2, the output data may include an identification of the set and the term, as well as an identification of a term type (for example, term format). As an example, the terms may be types as an MCQ, FITB question, pure question, etc. The output data may also contain an identification of a word side or definition side of the term (for example, card side) and a type of the card side (for example, side_format), such as question, answer, longer, shorter, etc. Although the disclosure discusses the above categories and/or identifications of output data, this disclosure contemplates any suitable output data.

2.3 Example Dynamic Generation of Alternate Question Process

Figure 3:
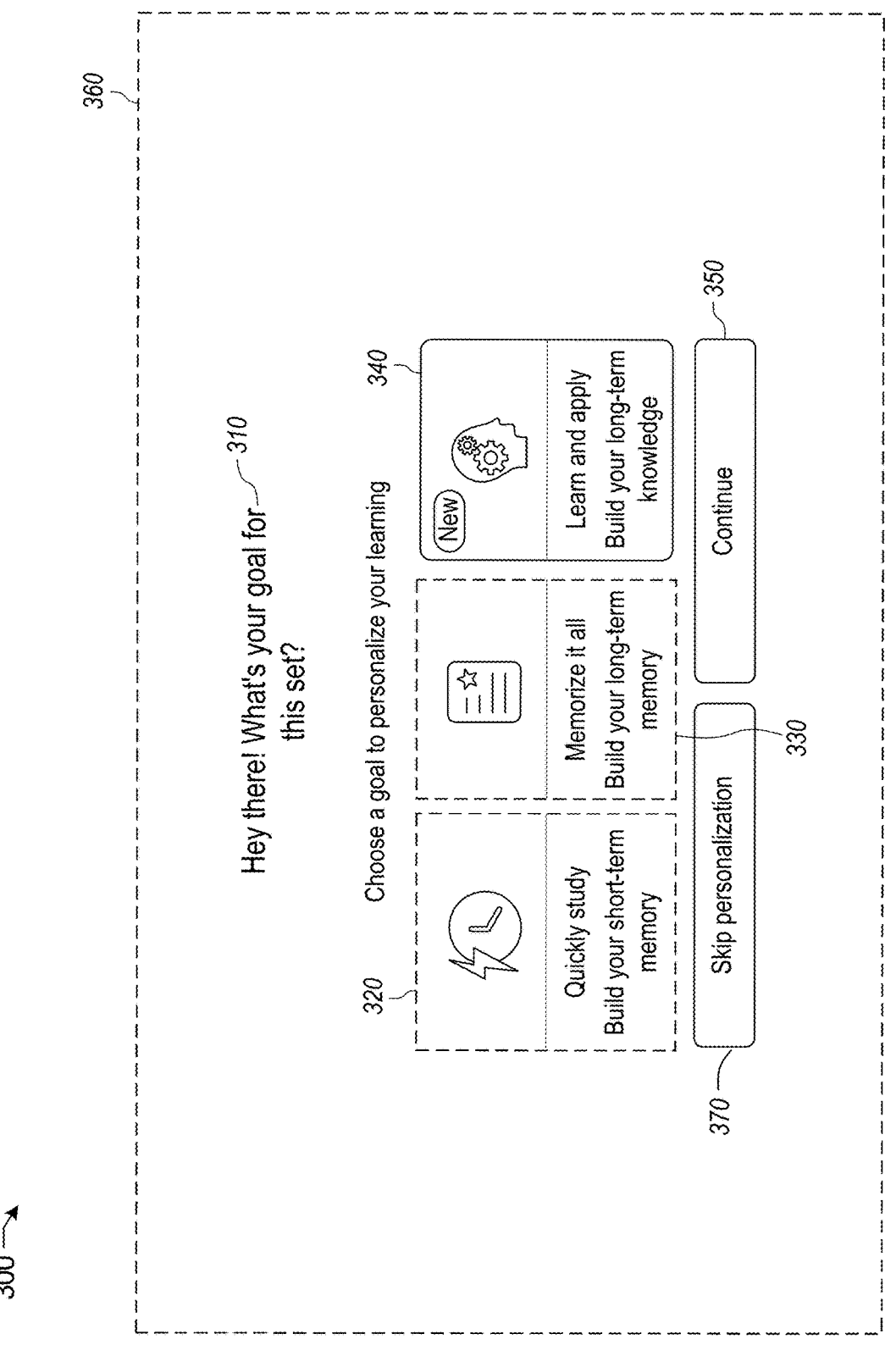
FIG. 3 illustrates an example diagram of a graphical user interface upon which one embodiment may be implemented.

FIG. 3 illustrates an example diagram 300 of a graphical user interface upon which one embodiment may be implemented. FIG. 3, and each other drawing figure of this disclosure that shows a graphical user interface or screen displays, is intended to show a portion of a computer display device and to represent outputs, renderings, and/or the execution of presentation instructions that occur, via a plurality of functional elements. It will be understood that a commercial or practical implementation of FIG. 3, and each other drawing figure of this disclosure that shows a graphical user interface or screen displays, involves creating, testing, and debugging programs, scripts, images, and commands that interoperate to output the content shown in the drawing figures or presentation instructions or browser side-script code that could be interpreted at the browser to render the content shown in the drawing figures, and the preparation of such programs, scripts, images, and commands is within the level of ordinary skill to which this disclosure is directed. A specific disclosure of programs, scripts, images, and commands is not needed as FIG. 3, and each other drawing figure of this disclosure that shows a graphical user interface or screen displays communicate the configuration and content that should result from the programming.

In an embodiment, one or more processors of the client computing device 120 may provide instructions to host and execute the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 may comprise a conventional internet browser application that is capable of communicating over network 170 to other functional elements via HTTP and is capable of rendering dynamic or static HTML, XML, or other markup languages, including displaying text, images, accessing video windows and players, and so forth within the browser 360. In embodiments, server computer 110 may provide an application extension 126 for application program 124 through which the aforementioned communication and other functionality may be implemented.

In an embodiment, the front-end of the application program 124 may render the DGAQ system as part of a GUI to appear on the client computing device 120. The DGAQ system may present the learner with one or more prompts 310. In the example of FIG. 3, prompt 310 may be displayed as "Hey there! What's your goal for this set?" Prompt 310 may lead the learner to select one of a plurality of selectable options 320, 330, and 340. Although this disclosure demonstrates three selectable options, this disclosure contemplates any suitable number of selectable options. In diagram 300, the plurality of selectable options 320, 330, 340 may represent a particular goal for personalizing the learner's learning. For example, selectable option 320 may display an option of "Quick Study. Build your short-term memory," selectable option 330 may display an option of "Memorize it all. Build your long-term memory," and selectable option 340 may display an option of "Learn and apply. Build your long-term knowledge." In this example, in response to prompt 310, a learner may provide input via a click, tap, touch, or other signal from a keyboard, pointing device, and/or touchscreen of client computing device 120 to select one or more of the selectable options.

In one embodiment, continue button 350 may be disabled until the learner has selected a threshold number of selectable options (for example, the learner must select at least one of selectable options 320, 330, or 340). In the example of FIG. 3, the learner has selected selectable option 340. In this example, because the learner has input the threshold number of selectable options 320, 330, 340, the continue button 350 may be enabled for the learner to select "Continue," in which case the graphical user interface may proceed to the next step of the DGAQ workflow. As an example, the learner may skip the personalization step (for example, selecting one of selectable options 320, 330, 340) by selecting skip button 370.

In an embodiment, in response to the learner input via a selection of one selectable option, the DGAQ system can retrieve cached candidate alternative questions in line with the learner's goal for display. For example, in one embodiment, previously computed and saved alternative questions can be maintained in the SPANNER database and retrieved.

Figure 4:
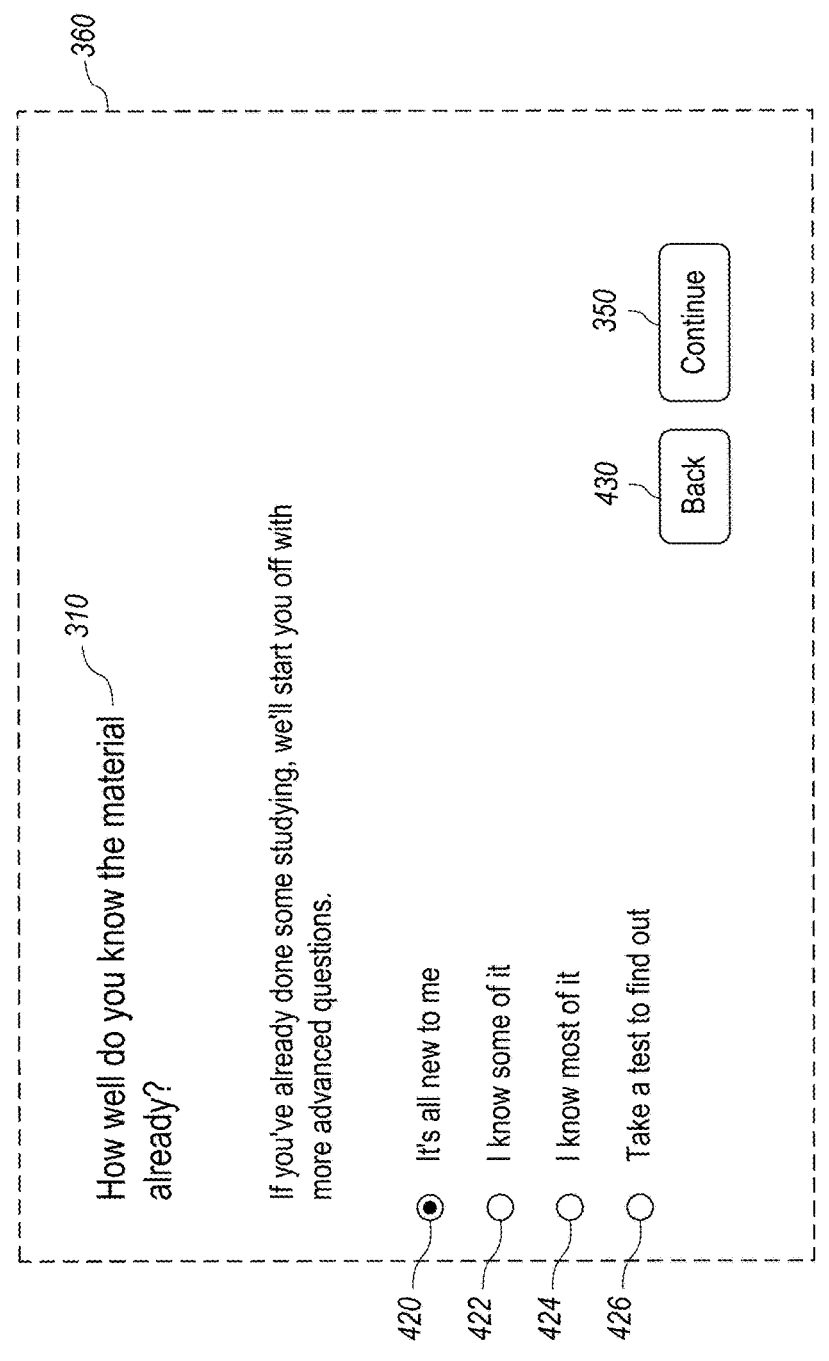
FIG. 4 illustrates an example diagram of a graphical user interface upon which one embodiment may be implemented.

FIG. 4 illustrates an example diagram 400 of a graphical user interface upon which one embodiment may be implemented. In an embodiment, one or more processors of the client computing device 120 may provide instructions to host and execute the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 may comprise a conventional internet browser application that is capable of communicating over network 170 to other functional elements via HTTP and is capable of rendering dynamic or static HTML, XML, or other markup languages, including displaying text, images, accessing video windows and players, and so forth within the browser 360. In embodiments, server computer 110 may provide an application extension 126 for application program 124 through which the aforementioned communication and other functionality may be implemented.

In an embodiment, the DGAQ system may transmit, from the server computer 110 to the client computing device 120, display instructions that are formatted to cause displaying, via a graphical user interface, a request for context through prompt 310. As an example, prompt 310 may be displayed to the learner along with a plurality of answer choices 420, 422, 424, 426. In the example of FIG. 4, prompt 310 may be displayed as "How well do you know the material already?" In diagram 400, each of the plurality of answer choices 420, 422, 424, 426 may represent a particular knowledge level. As an example, in response to prompt 310, the learner may provide input via a click, tap, touch, or other signal from a keyboard, pointing device, and/or touchscreen of client computing device 120 to select one of the plurality of answer choices. For example, as demonstrated in diagram 400, the learner may select answer choice 420 "It's all new to me," which indicates to the DGAQ system that the learner currently has a low knowledge level of the material. As another example, the learner may select answer choice 422 "I know some of it," which may indicate to the DGAQ system that the learner currently has a medium level of knowledge of the material. As an alternate example, the learner may select answer choice 424 "I know most of it," which may indicate to the DGAQ system that the learner currently has a high level of knowledge of the material.

In an embodiment, in response to receiving context input from the graphical user interface of client computing device 120 via a selected answer choice, the DGAQ system may determine a knowledge state of the learner, wherein the DGAQ system may filter one or more sets of alternative questions based on the determined knowledge state.

In an embodiment, the learner may be unsure of their current knowledge level, and may select answer choice 426 "Take a test to find out," in which the DGAQ system may be instructed to generate and present a test to the learner. In this example, the test may be used by the DGAQ system to determine the learner's current knowledge level. In each case, selection of one or the answer choices 420, 422, 424, 426 may instruct the DGAQ system to generate a personalized study path for the learner based at least on the material being studied and the current knowledge state/level of the learner.

In one embodiment, continue button 350 may be disabled until the learner has selected a threshold number of answer choices (for example, the learner must select one of answer choices 420, 422, 424, 426). In the example of FIG. 4, because the learner has selected answer choice 420, the continue button 350 may be enabled for the learner, in which case the graphical user interface may proceed to the next step of the DGAQ workflow. In an embodiment, the learner may be presented with back button 430, wherein upon selection, the user interface may return to and display the previous step of the DGAQ workflow via a graphical user interface of client computing device 120.

In an embodiment, each of answer choices 420, 422, 424, and 426 instruct the DGAQ system to display a particular question type corresponding to the learner's current knowledge level (for example, knowledge state). For example, if the learner provides input to the DGAQ system indicating a high knowledge level of the material they are studying, the DGAQ system may retrieve and filter questions and answers from an answer lookup table and/or question lookup table and present the best "context" question sets to be displayed in a graphical user interface of the client computing device 120. the best "context" question for the set may be displayed in the user interface of client computing device 120. As another example, if the user is determined to be in a low knowledge state, the best "reword" question for the set may be displayed to the user via the user interface of the client computing device 120. Table 5, below demonstrates example original terms, rewording alternative question, and context alternative question.

TABLE 5

| Exam-<br>ple 1: | • Original term<br>Word: Frontal Bone<br>Definition: the large cranial bone forming the front part of<br>the cranium: the forehead and the upper part of the orbits<br>• Rewording Alternative Question:<br>○ Question: The _____ _____ forms the<br>anterior part of the cranium, including upper<br>portion of the orbitals, the forehead, and the part<br>of the roof of nasal cavity.<br>○ Answer: Frontal Bone<br>• Context Alternative Question:<br>○ Question: forms the forehead, part of the floor of<br>the cranium, and most of the roof of the orbits.<br>(the orbit is the bony cavity that protects the eye.)<br>The _____ contains the two frontal sinuses,<br>with one located above each eye.<br>○ Answer: Frontal Bone |
|---|---|
| Exam-<br>ple 2: | • Original term<br>○ Word: stenosis<br>○ Definition:<br>Valve opening is rigid<br>Cannot fully open/close<br>Impedes forward flow of blood<br>Increases workload of chamber behind affected<br>valve Valvular heart disease<br>• Rewording Alternative Question:<br>○ Question: _____is the failure of a valve to<br>open completely obstructing forward flow<br>○ Answer: stenosis<br>• Context Alternative Question:<br>○ Question: _____ is when the valve will not<br>open all the way, making it harder to force blood<br>through it, cannot push blood forward.<br>○ Answer: stenosis |

In an embodiment, the DGAQ system may identify alternative question candidates to the original question by matching the answer cluster and a particular level of a subject first. Based on semantic similarities and the length ratio between the candidates and the original question, the DGAQ system may categorize candidate alternative questions into "rewording" or "context." In an embodiment, an alternative question may be categorized as a rewording question when it contains a semantic similarity of less than 70%, a length ratio between the alternative question and original question less than 200%, and not in a MCQ format. As an example, all other alternative questions may be categorized as context questions.

In an embodiment, as part of filtering and ranking, within each question category, the DGAQ system may group candidate questions into bins based on their cosine embedding similarity to the original question (for example, similarity range [10%-20%], [20%-30%], . . . , [80%-90%]). As an example, the DGAQ system may exclude questions that contain less than a 10% cosine embedding similarity or more than 90% cosine similarity.

In an embodiment, as part of filtering and ranking, within each similarity grouping, the DGAQ system may rank questions in the order of whether they match the original question on a level 3 subject (for example, subject_level_3), if the term is in an appropriate format, and the studier count (for example, popularity [0, 20), [20, 50), [50, 100), [100, 200), [200+)). As an example, the DGAQ system may choose one or more highest ranked questions from each group, combine the highest ranked questions, and re-rank the highest ranked questions in a particular order. As an example, the highest ranked questions may be re-ranked first by similarity, second by the level 3 subject match, third by format, and fourth by studier count. In this example, the ranks may be numbered (for example, first, second, third, etc.).

Learners create new terms daily when they create new flashcard sets. In an embodiment, the DGAQ system is continuously retrieving newly generated terms from server computer 110, aggregating, filtering, and choosing top alternative questions for rewording and context categories for the new terms. In an embodiment, the output may be saved in both BigQuery and/or Spanner. In an embodiment, when a learner studies a term, all relevant alternative questions related to the term may be retrieved from a production Spanner table. As an example, if a learner indicates that they are in a high knowledge state, the DGAQ system may retrieve rank one (1) context alternative questions, wherein otherwise rank one (1) rewording alternative questions may be retrieved for display to the learner.

In an embodiment, the DGAQ system's alternative question process may be implemented in SQL using BigQuery, including a monthly Airflow ETL generating answer cluster table and questions to answer cluster table. As another example, the DGAQ system may implement a daily Airflow ETL to aggregate and choose top alternative questions for newly created terms.

Figure 5:
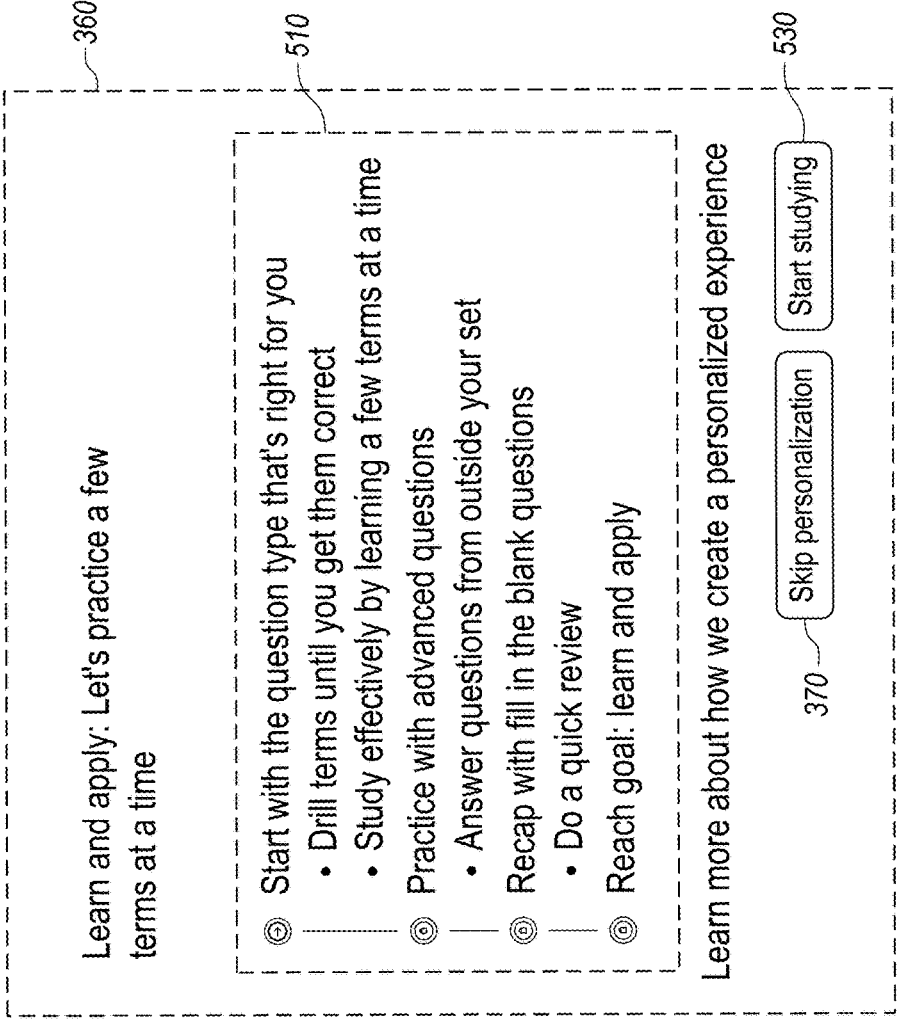
FIG. 5 illustrates an example diagram of a graphical user interface upon which one embodiment may be implemented.

FIG. 5 illustrates an example diagram 500 of a graphical user interface upon which one embodiment may be implemented. In an embodiment, one or more processors of the client computing device 120 may provide instructions to host and execute the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 may comprise a conventional internet browser application that is capable of communicating over network 170 to other functional elements via HTTP and is capable of rendering dynamic or static HTML, XML, or other markup languages, including displaying text, images, accessing video windows and players, and so forth within the browser 360. In embodiments, server computer 110 may provide an application extension 126 for application program 124 through which the aforementioned communication and other functionality may be implemented.

In some embodiments, the front-end of application program 124 may render the DGAQ system as part of a GUI to appear on client computing device 120. As an example, in response to the learner initiating a personalized study path as demonstrated in FIG. 4, the DGAQ system may be instructed to present instructions and/or information about the personalized experience to the learner. For example, in diagram 500, content 510 may be presented to the learner in the form of a workflow breakdown. As an example, the personalized experience may inform the learner that the DGAQ system may "Start with the question type that's right for you," and inform the learner that the workflow may present the learner with a few terms at a time, and continue to present the terms until the learner reaches a particular threshold of correctly answering the terms. In response to determining the learner has reached a particular threshold of correct answers, the DGAQ system may proceed to a next and/or higher level of questions, which may be more advanced than the terms presented at the beginning of the workflow. In this example, the DGAQ system may proceed to move to "Practice with advanced questions" (for example, alternative questions), wherein the DGAQ system may retrieve one or more filtered questions and answers from an answer lookup table and/or question lookup table based on the current knowledge state of the learner. In an embodiment, the DGAQ system may proceed to generate a "Recap with fill in the blank questions," in which fill-in-the-blank (FITB) questions may be presented to the learner until the learner reaches a particular threshold of correct answers to the FITB questions. In an embodiment, the personalized experience may determine the learner's current knowledge state has reached a particular goal, wherein the DGAQ system may complete the workflow.

In an embodiment, the learner may skip the personalization experience by selecting skip button 370. In this example, the DGAQ system may terminate a personalized experience workflow and direct the learner to study terms as originally input by the learner. In an embodiment, the learner may select start button 530, wherein the DGAQ system may be instructed to proceed to the next stage of the personalized experience workflow.

Figure 6:
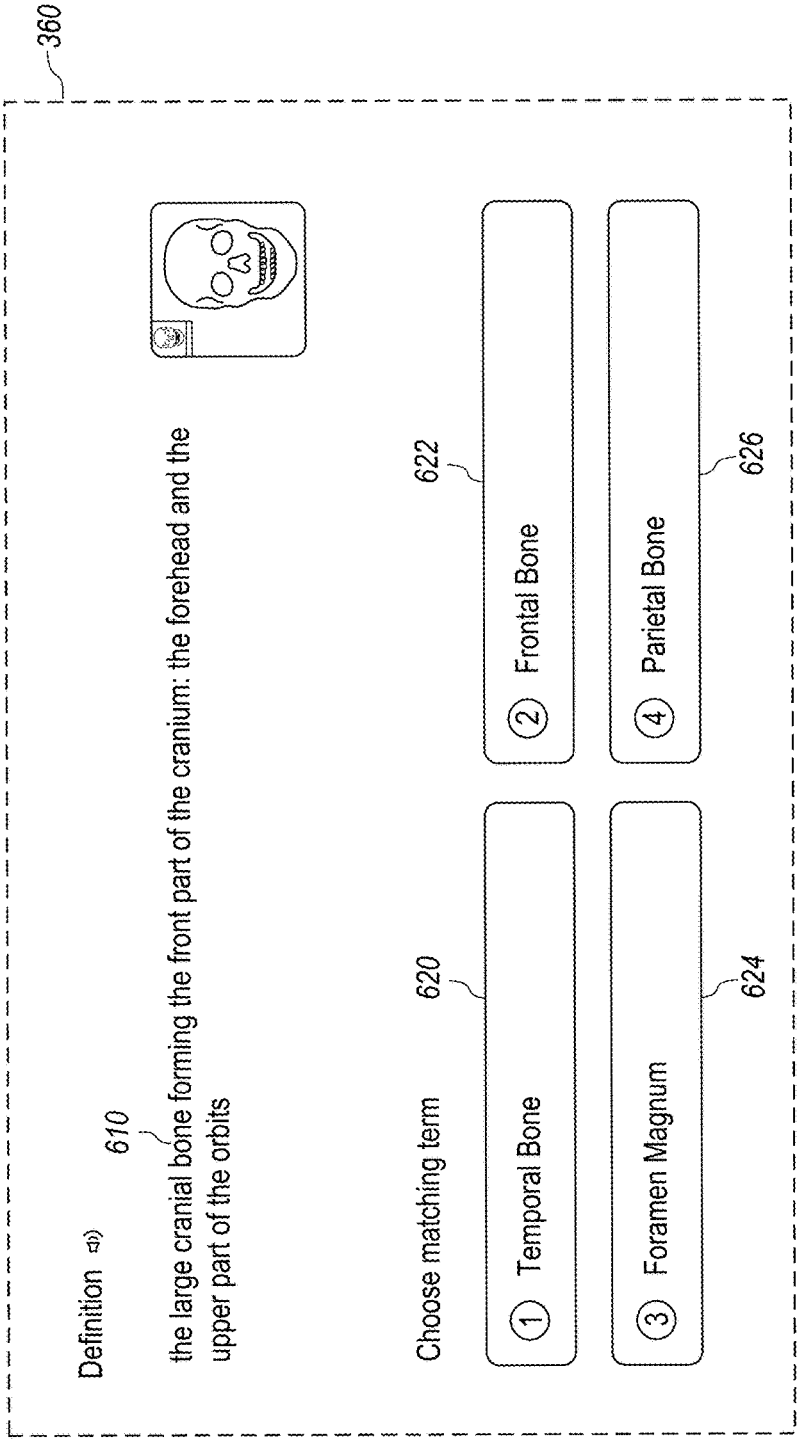
FIG. 6 illustrates an example diagram of a graphical user interface upon which one embodiment may be implemented.

FIG. 6 illustrates an example diagram 600 of a graphical user interface upon which one embodiment may be implemented. In an embodiment, one or more processors of the client computing device 120 may provide instructions to host and execute the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 may comprise a conventional internet browser application that is capable of communicating over network 170 to other functional elements via HTTP and is capable of rendering dynamic or static HTML, XML, or other markup languages, including displaying text, images, accessing video windows and players, and so forth within the browser 360. In embodiments, server computer 110 may provide an application extension 126 for application program 124 through which the aforementioned communication and other functionality may be implemented.

In an embodiment, the DGAQ system may instruct browser 360 to present original definition 610 and a plurality of answer choices 620, 622, 624, 626. As demonstrated in Table 5, Example 1, the original definition 610 is "the large cranial bone forming the front part of the cranium: the forehead and the upper part of the orbits." As used herein "original definition" and "original word" refer to components of terms the learner input themselves when creating a set of terms (for example, flashcards). In this example, the answer (for example, the original word), is answer choice 622, "Frontal Bone." As an example, original definition 610 may be dictated to the learner. As another example, additional media (for example, photos, videos) may be displayed to the learner along with original definition 610 and answer choices 620, 622, 624, 626.

In an embodiment, the learner may select an answer choice (for example, answer choice 622) via a click, tap, touch, or another signal from a keyboard, pointing device, and/or touchscreen of client computing device 120.

Figure 7:
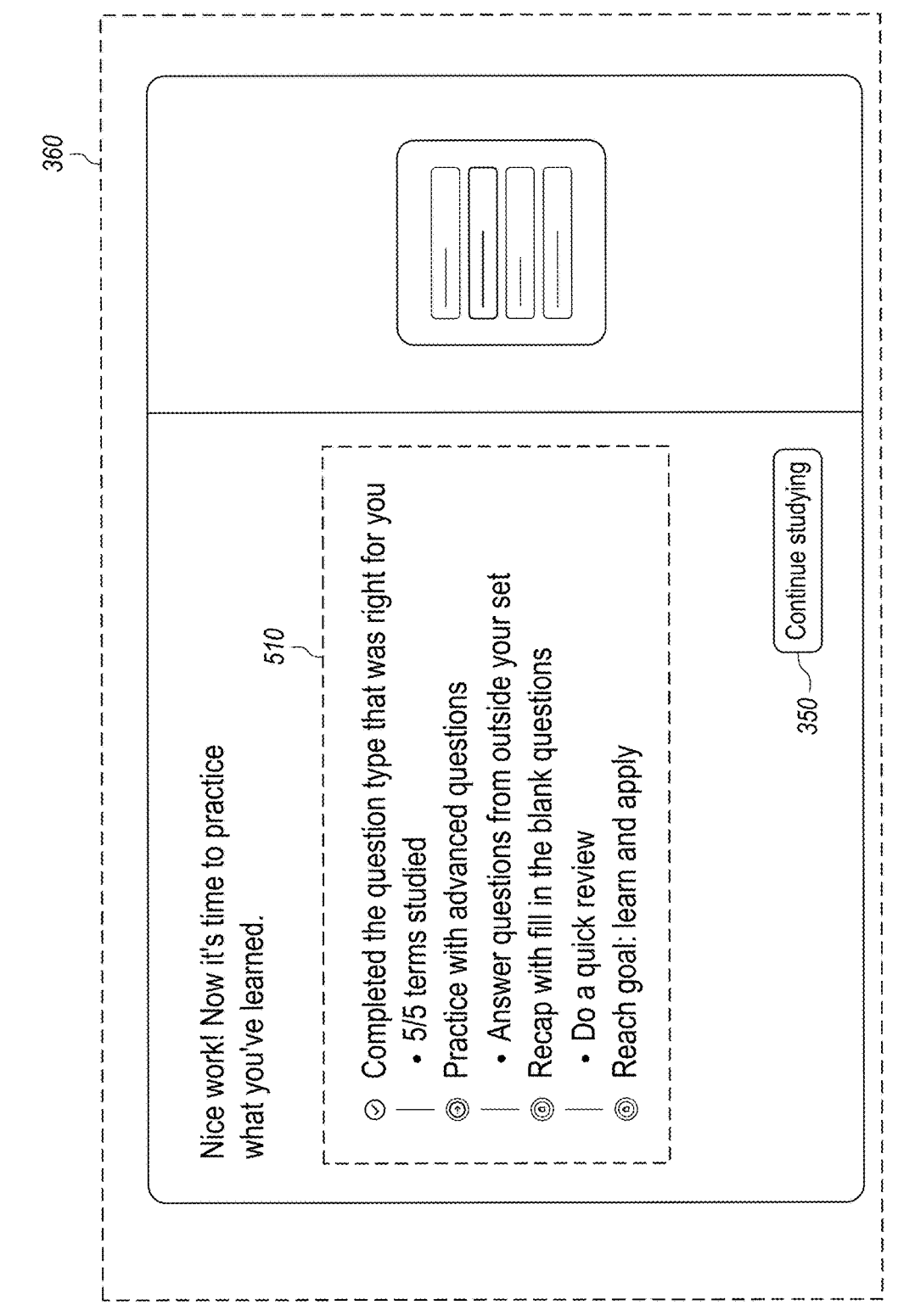
FIG. 7 illustrates an example diagram of a graphical user interface upon which one embodiment may be implemented.

FIG. 7 illustrates an example diagram 700 of a graphical user interface upon which one embodiment may be implemented. In an embodiment, one or more processors of the client computing device 120 may provide instructions to host and execute the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 may comprise a conventional internet browser application that is capable of communicating over network 170 to other functional elements via HTTP and is capable of rendering dynamic or static HTML, XML, or other markup languages, including displaying text, images, accessing video windows and players, and so forth within the browser 360. In embodiments, server computer 110 may provide an application extension 126 for application program 124 through which the aforementioned communication and other functionality may be implemented.

In an embodiment, the DGAQ system may determine that a learner has correctly answered a threshold number of questions and/or completed the question set of original definitions 610, wherein one or more processors of client computing device 120 may provide instructions to present content 510 to the learner. As an example, content 510 may be displayed to the learner via a graphical user interface of client computing device 120. In the example of FIG. 7, content 510 may include a review of the learner's workflow (for example, "5/5 terms studied). Content 510 may also display the next steps in the learner's workflow. In an embodiment, the learner may be presented with continue button 350, wherein upon selection, the continue button 350 may instruct the graphical user interface of the DGAQ system to proceed to the next step of the DGAQ workflow.

Figure 8:
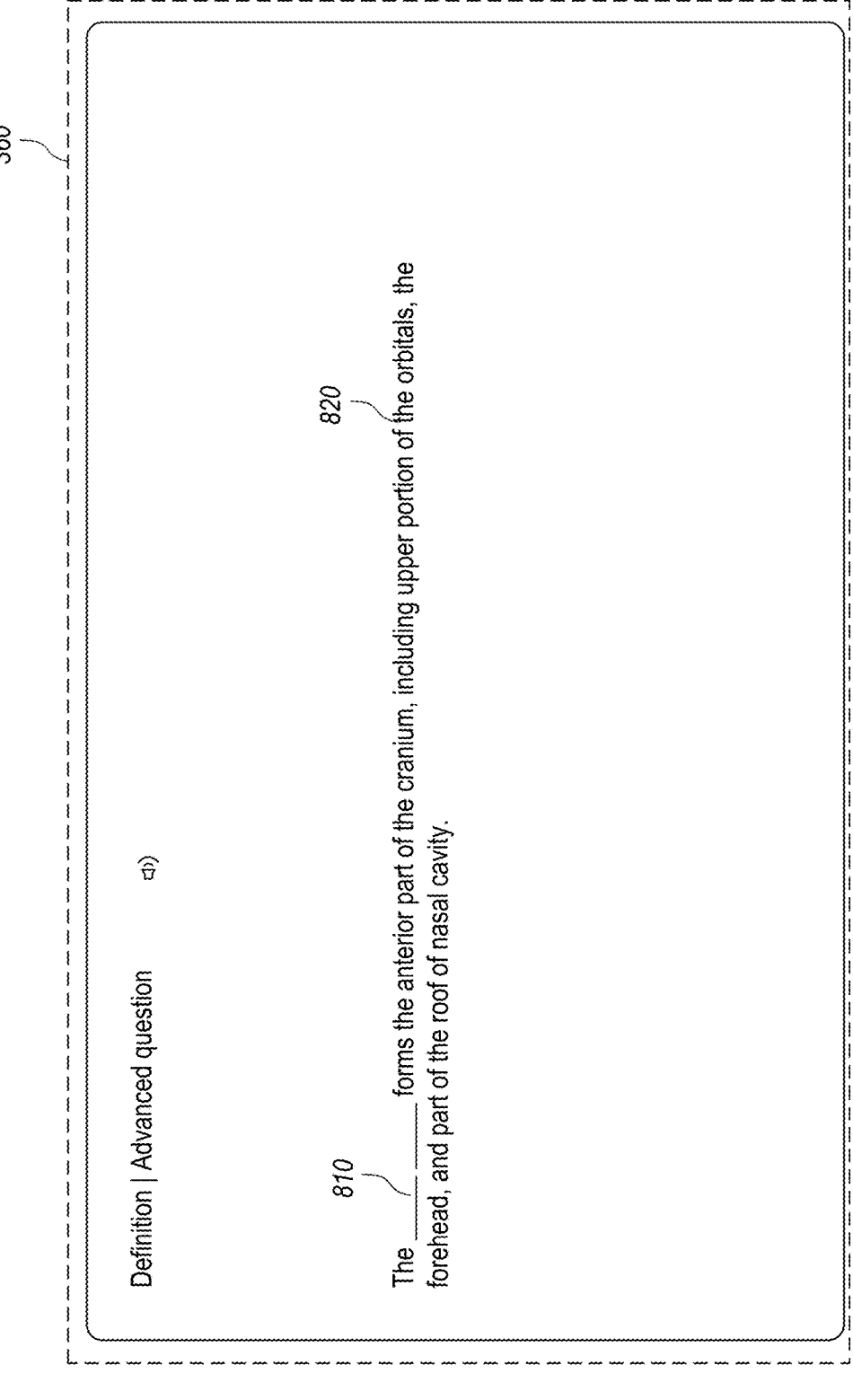
FIG. 8 illustrates an example diagram of a graphical user interface of an alternative question within a personalized workflow.

FIG. 8 illustrates an example diagram 800 of a graphical user interface of an alternative question within a personalized workflow In an embodiment, one or more processors of the client computing device 120 may provide instructions to host and execute the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 may comprise a conventional internet browser application that is capable of communicating over network 170 to other functional elements via HTTP and is capable of rendering dynamic or static HTML, XML, or other markup languages, including displaying text, images, accessing video windows and players, and so forth within the browser 360. In embodiments, server computer 110 may provide an application extension 126 for application program 124 through which the aforementioned communication and other functionality may be implemented.

As an example, the DGAQ system may be programmed to retrieve and filter questions from a question cluster table based on one or more original definitions 610 input by the learner. In some embodiments, ranking instructions 162 may rank the filtered questions by relevance, whereas output instructions 144 may output tailored questions to the learner. In this way, the system may be programmed to use the answer cluster key to retrieve a question list for display to the learner via a GUI of client computing device 120. As demonstrated in FIG. 8, the DGAQ system may display an alternative definition 820 containing a fill-in-the-blank section 810. In this example, alternative definition 820 "The _____ _____ forms the anterior part of the cranium, including upper portion of the orbitals, the forehead, and part of the root of nasal cavity" is a "rewording alternative question" type, as discussed in Table 5, Example 1. In this example, advanced definition 820 is an alternative question of the "rewording" type for the term "Frontal Bone." As demonstrated in Table 5, Example 1, a "context alternative question" type may also be generated and displayed in browser 360 for a learner with a high knowledge state.

FIG. 9 illustrates a flow diagram 900 of a method for dynamic generation of alternative questions. FIG. 9 is intended as an illustration at the functional level at which skilled persons, in the art to which this disclosure pertains, communicate with one another to describe and implement algorithms using programming. The flow diagram is not intended to illustrate every instruction, method, object or sub-step that would be needed to program every aspect of a working program, but is provided at the same functional level of illustration that is normally used at the high level of skill in this art to communicate the basis of developing working programs.

Referring to FIG. 9, in one embodiment, computer-implemented method 900 may begin execution at step 902 with digitally storing, in memory of a server computer 110, a plurality of machine learning classification models 130. In an embodiment, one or more of these machine learning classification models 130 may instead be stored and subsequently accessed from device memory 128 of client computing device 120.

In one embodiment, after executing step 902, computer-implemented method 900 may execute step 904, wherein step 904 may include retrieving, from server computer 110, metadata including a plurality of terms, wherein each of the terms include a question side value and an answer side value. As an example, each of the terms may include at least a word and a definition. As another example, the word and definition of each term may be referred to as an "original word" and/or original definition 610.

In one embodiment, computer-implemented method 900 may continue at step 906 by categorizing, by the one or more machine learning models created in step 902, each of the plurality of terms into a particular type and identifying the answer side values of each of the plurality of terms.

In one embodiment, in response to step 906, the DGAQ system may perform step 908. As an example, step 908 may involve executing, by the one or more machine learning models, one or more algorithms with instructions to cluster the question side values and answer side values of each of the plurality of terms according to one or more criteria. In an embodiment, as part of generating answer clusters and question clusters, the DGAQ system may tokenize the plurality of terms into one or more n-grams with an n range from three to four. As another example, the DGAQ system may apply a locality-sensitive hashing (LSH) algorithm to the n-grams, wherein the n-grams may be transformed into a string, to generate answer clusters.

In one embodiment, computer-implemented method 900 may execute step 910 after step 908, wherein step 910 involves receiving, by client computing device 120, text input including a first term. In an embodiment, next the computer-implemented method 900 may execute step 912, wherein step 912 involves retrieving from server computer 110, the one or more clusters of question side values and answer side values corresponding to the text input of the first term. As an example, the DGAQ system may transmit, from the server computer 110 to the client computing device 120, first display instructions that are formatted to cause displaying, via a graphical user interface, an editable text field and a prompt to input a term. In this example, the client computing device 120 may receive text input via the editable text field, wherein the DGAQ system may determine the text input includes at least one term.

In an embodiment, computer-implemented method 900 may execute step 914, wherein step 914 involves filtering and ranking the one or more clusters of question side values based on one or more attributes corresponding to the first term. As an example, the filtering and ranking of the one or more clusters of question side values and answer side values may further include categorizing the one or more attributes, wherein the attributes may include one or more of a grade level, subject type, popularity score, and/or other criteria.

In an embodiment, the DGAQ system may determine, by the one or more machine learning model, a normalization coefficient for the answer value side of each of the plurality of terms.

In an embodiment, computer-implemented method 900 may execute step 916, wherein step 916 involves determining a first cluster of question side values and answer side values are ranked above a predetermined threshold. As an example, the first cluster may be categorized as one or more alternative questions.

In an embodiment, in response to executing step 916, computer-implemented 900 may execute step 918, wherein step 918 involves displaying, via a graphical user interface at the client computing device 120, the one or more alternative questions.

3.0 Implementation Example—Hardware Over View

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
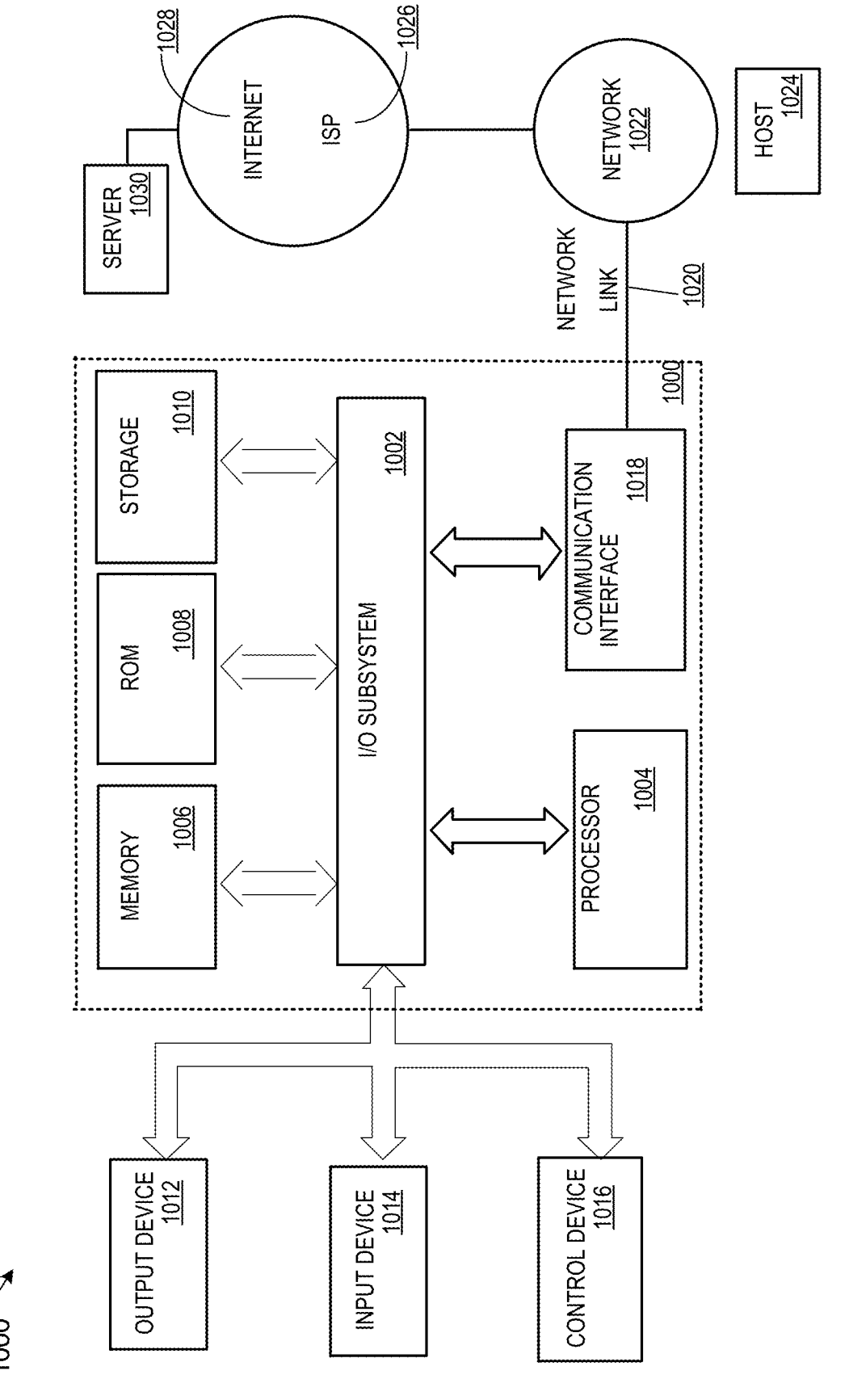
FIG. 10 is a block diagram that illustrates a computer system upon which one embodiment may be implemented.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; client interface instructions to render or interpret commands for a graphical user interface (GUI), command-line interface or text client interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to a format that can be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; client interface instructions to render or interpret commands for a graphical user interface (GUI), command-line interface or text client interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive client applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising, digitally storing, in memory of a server computer, a plurality of trained machine learning classification models;

retrieving, from the server computer, metadata including a plurality of terms, wherein each of the terms include a word side value and a definition side value;

categorizing, by one or more machine-learning classification models of the plurality of machine learning classification models, each of the plurality of terms into a particular term type and identifying which of the word side value and the definition side value constitutes an answer side value of each of the plurality of terms;

normalizing by the server computer, the answer side value of each term to generate a normalized answer string by applying Normalization Form Compatibility Decomposition (NFKC) to standardize Unicode code points;

transforming, by the server computer, each normalized answer string into a set of character n-grams, concatenating the n-grams into a transformed string, and applying a locality-sensitive hashing algorithm to assign the transformed string to a bucket in the memory associated with a Jaccard similarity threshold;

generating, by the server computer, an answer cluster table that maps a hashed cluster key to a canonical cluster answer and to a plurality of normalized answer strings assigned to the same bucket, and generating a question cluster table that maps the hashed cluster key to a plurality of question side values that are associated with the canonical cluster answer;

receiving, by a client computing device, text input including comprising a first term that includes a first question side value and a first answer side value;

retrieving, from the answer cluster table and the question cluster table, using the server computer, a plurality of candidate alternative question side values mapped to a hashed cluster key corresponding to a normalized version of the first answer side value, and filtering the plurality of candidate alternative question side values based on attributes associated with the first term;

computing, by the server computer, for each of the plurality of candidate alternative question side values: a semantic similarity score to the first question side value based on cosine similarity of sentence embeddings;

categorizing the plurality of candidate alternative question side values into a rewording category or a context category based on at least the semantic similarity score;

ranking the candidate alternative question side values within each category;

transmitting, from the server computer to the client computing device, presentation instructions formatted to cause the client computing device to display a graphical user interface that presents an editable text field to receive the first term, a plurality of question values and corresponding answer values as part of a study workflow, and at least a top-ranked one of the candidate alternative question side values as an alternative question associated with the first term;

determining a user's knowledge state by receiving selections to prompts and, responsive to interaction with the plurality of question values and the corresponding answer values, determining whether a predetermined correctness threshold is met; and in response to determining that the predetermined correctness threshold is met, causing, by the presentation instructions, display of one or more alternative questions selected from the top-ranked candidate alternative question side values in the category corresponding to the user's knowledge state, thereby generating and presenting alternative questions for the first term using the hashed cluster key and the clustered question side values without performing a brute-force comparison across the plurality of terms.

2. The computer-implemented method of claim 1, the filtering further comprising:

filtering the plurality of candidate alternative question side values based on one or more of a grade level, subject hierarchy level, question format quality, or popularity score.

3. The computer-implemented method of claim 1, the computing further comprising:

computing, by the server computer, for each of the plurality of candidate alternative question side values: the semantic similarity score to the first question side value based on the cosine similarity of the sentence embeddings, and a length ratio relative to the first question side value.

4. The computer-implemented method of claim 1, the filtering further comprising:

transmitting, from the server computer to the client computing device, second display instructions that are formatted to cause displaying, in the graphical user interface, a request for context;

receiving context input from the graphical user interface of the client computing device;

in response to receiving the context input, determining a knowledge state of the user of the client computing device;

filtering the alternative questions based on the determined knowledge state.

5. The computer-implemented method of claim 1, further comprising:

determining, by the one or more machine learning models, a normalization coefficient for the answer value side of each of the plurality of terms;

filtering the answer value side of each of the plurality of terms by the normalization coefficient.

6. A computer-readable non-transitory storage media comprising instructions executable by a processor to:

digitally store, in memory of a server computer, a plurality of trained machine learning classification models;

retrieve, from the server computer, metadata including a plurality of terms, wherein each of the terms include a word side value and a definition side value;

categorize, by one or more machine-learning classification models of the plurality of machine learning classification models, each of the plurality of terms into a particular term type and identifying which of the word side value and the definition side value constitutes an answer side value of each of the plurality of terms;

execute, by the one or more machine learning classification models, one or more algorithms with instructions to cluster the question side values and answer side values of each of the one or more terms according to one or more criteria;

normalize by the server computer, the answer side value of each term to generate a normalized answer string by applying Normalization Form Compatibility Decomposition (NFKC) to standardize Unicode code points;

transform, by the server computer, each normalized answer string into a set of character n-grams, concatenating the n-grams into a transformed string, and applying a locality-sensitive hashing algorithm to assign the transformed string to a bucket in the memory associated with a Jaccard similarity threshold;

generate, by the server computer, an answer cluster table that maps a hashed cluster key to a canonical cluster answer and to a plurality of normalized answer strings assigned to the same bucket, and generate a question cluster table that maps the hashed cluster key to a plurality of question side values that are associated with the canonical cluster answer;

receive, by a client computing device, text input including comprising a first term that includes a first question side value and a first answer side value;

retrieve, from the answer cluster table and the question cluster table, using the server computer, the one or more clusters a plurality of candidate alternative question side values mapped to a hashed cluster key corresponding to a normalized version of the first answer side corresponding to the text input of value, and filtering the plurality of candidate alternative question side values based on attributes associated with the first term;

compute, by the server computer, for each of the plurality of candidate alternative question side values: a semantic similarity score to the first question side value based on cosine similarity of sentence embeddings;

categorize the plurality of candidate alternative question side values into a rewording category or a context category based on at least the semantic similarity score;

rank the candidate alternative question side values within each category;

transmit, from the server computer to the client computing device, presentation instructions formatted to cause the client computing device to display a graphical user interface that presents an editable text field to receive the first term, a plurality of question values and corresponding answer values as part of a study workflow, and at least a top-ranked one of the candidate alternative question side values as an alternative question associated with the first term;

determine a user's knowledge state by receiving selections to prompts and, responsive to interaction with the plurality of question values and the corresponding answer values, determining whether a predetermined correctness threshold is met; and in response to determining that the predetermined correctness threshold is met, cause, by the presentation instructions, displaying one or more alternative questions selected from the top-ranked candidate alternative question side values in the category corresponding to the user's knowledge state, thereby generating and presenting alternative questions for the first term using the hashed cluster key and the clustered question side values without performing a brute-force comparison across the plurality of terms.

7. The media of claim 6, the instructions for filtering and ranking of the one or more clusters of question side values and answer side values being further executable by the processor to:

filtering the plurality of candidate alternative question side values based on one or more of a grade level, subject hierarchy level, question format quality, or popularity score.

8. The media of claim 6, wherein the instructions for categorizing each of the plurality of terms into a particular term type further comprise instructions for categorizing each of the plurality of terms into a particular term type selected from multi-choice question, fill-in-the-blank, pure question, raw term, polar question, or solution.

9. The media of claim 6, wherein the instructions to categorize further comprise instructions for categorizing the plurality of candidate alternative question side values into a rewording category or a context category based on at least the semantic similarity score, a length ratio, and an exclusion of multiple-choice formatted questions from the rewording category.

10. The media of claim 6, wherein the instructions to rank further comprise instructions for ranking, by the server computer, the candidate alternative question side values within each category based on semantic similarity within a bounded range, subject hierarchy level match, format quality, and popularity score.

11. The computer-implemented method of claim 1, wherein to categorize each of the plurality of terms into a particular term type further comprises categorizing each of the plurality of terms into a particular term type selected from multi-choice question, fill-in-the-blank, pure question, raw term, polar question, or solution.

12. The computer-implemented method of claim 1, wherein the categorizing further comprises categorizing the plurality of candidate alternative question side values into a rewording category or a context category based on at least the semantic similarity score, a length ratio, and an exclusion of multiple-choice formatted questions from the rewording category.

13. The computer-implemented method of claim 1, wherein the ranking further comprises ranking, by the server computer, the candidate alternative question side values within each category based on semantic similarity within a bounded range, subject hierarchy level match, format quality, and popularity score.

\* \* \* \* \*